United States Patent
Jensen

(10) Patent No.: US 7,309,366 B2
(45) Date of Patent: Dec. 18, 2007

(54) BAG CLEANING COMPRESSED AIR NOZZLE

(76) Inventor: Robert M. Jensen, 922 N. Chalet Ave., Tucson, AZ (US) 85748

(*) Notice: Subject to any disclaimer, the term of this patent is extended or adjusted under 35 U.S.C. 154(b) by 0 days.

(21) Appl. No.: 11/399,061

(22) Filed: Apr. 5, 2006

(65) Prior Publication Data

US 2006/0230936 A1   Oct. 19, 2006

Related U.S. Application Data

(60) Provisional application No. 60/668,369, filed on Apr. 5, 2005.

(51) Int. Cl.
*B01D 46/02* (2006.01)

(52) U.S. Cl. .............................. 55/283; 55/284; 55/294; 55/302; 95/279; 15/312.1; 15/312.2; 15/352; 210/332; 210/409; 210/413

(58) Field of Classification Search .................. 55/284, 55/294, 302, 283; 95/279; 15/312.1, 312.2, 15/352; 210/332, 409, 413
See application file for complete search history.

(56) References Cited

U.S. PATENT DOCUMENTS

| | | | | |
|---|---|---|---|---|
| 3,095,289 A * | 6/1963 | Egan | ............................ | 55/293 |
| 3,167,415 A * | 1/1965 | Edwards | ...................... | 55/302 |
| 3,178,868 A * | 4/1965 | Gibby | ......................... | 95/280 |
| 3,594,992 A * | 7/1971 | Carr et al. | .................... | 55/302 |
| 3,606,736 A * | 9/1971 | Leliaert et al. | ................ | 55/302 |
| 3,726,066 A * | 4/1973 | Colley et al. | ................. | 55/302 |
| 3,739,557 A * | 6/1973 | Anderson et al. | ............. | 55/302 |
| 3,837,151 A * | 9/1974 | Jensen | ........................ | 55/341.1 |
| 3,853,508 A * | 12/1974 | Gordon et al. | ................ | 55/302 |
| 4,046,526 A * | 9/1977 | Phillippi | ...................... | 95/279 |
| 4,058,379 A * | 11/1977 | Cheng | ......................... | 55/302 |
| 4,280,826 A * | 7/1981 | Johnson, Jr. | ................. | 55/302 |
| 4,648,889 A * | 3/1987 | Jensen | ........................ | 55/341.2 |
| 4,648,970 A * | 3/1987 | Hermansson | ............... | 210/327 |
| 5,062,873 A * | 11/1991 | Karlsson | ...................... | 55/302 |
| 5,199,965 A * | 4/1993 | van Ackeren | ................ | 55/293 |
| 5,269,835 A * | 12/1993 | Jensen | ........................ | 95/279 |
| 5,395,409 A * | 3/1995 | Klimczak et al. | ............. | 55/302 |
| 5,814,114 A * | 9/1998 | Stueble | ........................ | 55/284 |
| 5,948,143 A * | 9/1999 | Sjostrom et al. | .............. | 95/134 |
| 6,022,388 A * | 2/2000 | Andersson et al. | ........... | 55/302 |
| 6,129,852 A * | 10/2000 | Elliott et al. | ................. | 210/791 |
| 6,136,072 A * | 10/2000 | Sjostrom et al. | .............. | 95/134 |
| 2005/0252178 A1* | 11/2005 | Richard | ........................ | 55/302 |
| 2006/0086071 A1* | 4/2006 | Messina | ....................... | 55/302 |

OTHER PUBLICATIONS

BPA Air Quality Solutions LLC, http://www.breathepureair.com/dust-collectors-baghouse.html, Apr. 3, 2006.

* cited by examiner

*Primary Examiner*—Duane Smith
*Assistant Examiner*—Minh-Chau T. Pham
(74) *Attorney, Agent, or Firm*—Quarles & Brady LLP; Gavin J. Milczarek-Desai

(57) ABSTRACT

A process and apparatus for cleaning filter cake from the interior of a baghouse bag. A nozzle through which compressed gas flows is positioned on the interior of a bag such that gas is directed to, and thereby disrupts, the filter cake. The compressed gas flows in the same direction as a gas that is being filtered by the baghouse, thereby avoiding the effects of reverse-flow cleaning.

7 Claims, 3 Drawing Sheets

BAG CLEANING COMPRESSED AIR NOZZLE

STATEMENT OF RELATED APPLICATION

This application claims priority to U.S. Provision Application Ser. No. 60/668,369, which was filed on Apr. 5, 2005, by the same inventor.

BACKGROUND OF THE INVENTION

1. Field of the Invention

This invention relates to an apparatus and process for removing filter cake from filters primarily used for industrial applications, such as removing fly ash from coal-fired flue gas.

2. Description of the Related Art

In the art of filtration, there is a type of filters commonly referred to as "baghouses." A baghouse is an air pollution abatement device used to trap particulates by filtering gas streams under suction through large fabric tubes called bags. These bags are typically made of glass fibers or fabric. One type of baghouse uses bags that are made of fabrics, such as woven fiberglass, and that are typically 6", 8" or 12" in nominal diameter, with length-to-diameter ratios up to about 60 inches. In operation, the trapped particulates (i.e., "filter cake") is collected on the inside of the bags and subsequently removed. Removal typically is effected by a reverse flow process ("backwash") of clean gas.

In one version of baghouse design, the bottom of the bag is open, the top of the bag is closed, and the dirty gas flow is up into the bag. This is known as the "bottom inlet reverse flow baghouse" or (BI).

Another type of baghouse design is the same as the (BI), except that both ends of the bag are open, the dirty gas enters the top of the bags, and the dirty gas flow is down in the bag. This design is known as the "top inlet reverse flow baghouse" or (TI).

The third type of baghouse uses bags that collect filtrate on the outside of the bag, which are open at the top, closed at the bottom, and cleaned by reverse flow of bursts of compressed air. This design is known as a "pulse—jet baghouse" or (PJ).

Bag collapse during reverse flow cleaning is limited in BIs and TIs by anti-collapse metal rings sewn at variable intervals on the full length of the outside of the bags. PJ bags are supported by internal wire cages that limit collapse when the bags are on line.

BIs are usually cleaned one compartment at a time and return the dirty reverse "air" to the inlet duct ahead of the downstream compartments. The compartments are usually arranged in two parallel rows, both rows served by a common inlet duct, which also receives the dirty gas leaving the compartment being cleaned. The first two compartments in line never see any dirty reverse flow, which is cleaned by the other compartments.

With one or more of the BI compartments off line for cleaning there is variable flow through the baghouse that has to be accommodated by the plant control system. The flow rate for a newly cleaned BI compartment is high and decreases with time on line. The flow rate entering the bottom of a BI bag decreases to zero at the top of the bag because the gas volume rising in the bag decreases as gas leaves the bag. Therefore, in multi-compartment BIs, each compartment operates at a different and variable flow rate.

PJ compartments operate at constant flow rate that does not vary with time on line, and PJ bags are cleaned on line. The flow rate entering the bags is high at the bottom of the bags and decreases to zero at the top of the bags. However, some of the cake blown off during cleaning is recaptured and refiltered by adjacent on line bags.

Similarly, in BIs, some of the particulate (filter cake) is refiltered a variable number of times and in variable amounts depending on the position of the compartment in the baghouse.

The filter cake in both BIs and PJs varies in cake thickness and particle size distribution over the length of every bag. The filter cake in TIs has uniform particle size distribution over the full length of the every bag. TI cake permeability is thought to be uniform over the full length of every bag and decreases with time on line.

The present state-of-the-art for TIs requires off-line cleaning which varies the amount of cloth in service, affects the plant control system, and necessitates some refiltering.

While suitable for their intended purpose, BIs and PJs have some disadvantages as described above. TIs have none of these faults and do have some features that are not possible with the other baghouse designs. Thus, there continues to be a need for improved bag cleaning, especially utilizing a TI design.

SUMMARY OF INVENTION

The invention relates to a means to clean baghouse bags, and especially TI bags, on line and without reverse flow. A compressed gas (e.g., air) nozzle is disposed within the top of a bag to clean away filter cake. The nozzle typically would be placed in position after the bag has been installed and is supported by the top edge of the bag thimble or other structure. The nozzle of the invention also serves to protect the top cuff of the bag from abrasion.

The frequency and duration of the compressed air can be varied to obtain the optimum combination of baghouse pressure loss and the compressed air consumption.

The nozzle material is light gauge metal or equivalent, and the compressed air pressure can be suited to each application. Hence, the benefits derived from the use of the compressed air nozzle with TI bags in particular can include: No reverse air fan, ducts, dampers and controls, no anti-collapse rings or cages, no refiltering of reverse flow and floaters, no refiltering of compressed air and particulate, no fluctuation of main controls, lower baghouse and bag costs, lower auxiliary power, adjustable cleaning to obtain lowest pressure loss, and intermittent compressed air instead of continuous use of reverse flow or compressed air.

DETAILED DESCRIPTION OF THE PREFERRED EMBODIMENTS

The apparatus and process of the invention make it possible for an air nozzle to dislodge filter cake at the top of baghouse bags. Others have tried, with very little success, to dislodge filter cake in the tops of bottom inlet bags by sonic energy and by shaking the bags.

Figure 1:
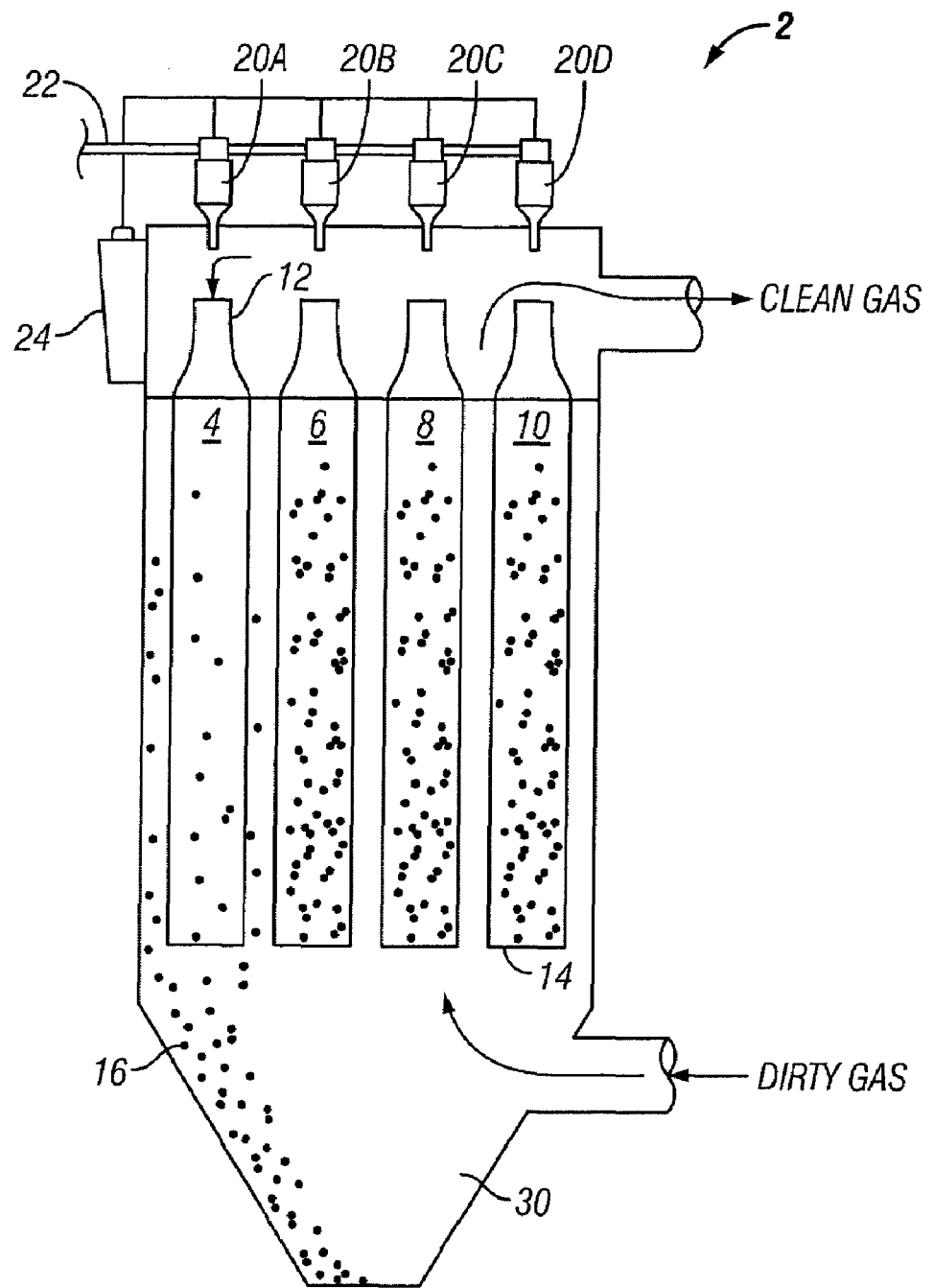
FIG. 1 schematically illustrates a prior art baghouse of the pulse jet (PJ) variety.
Figure 2:
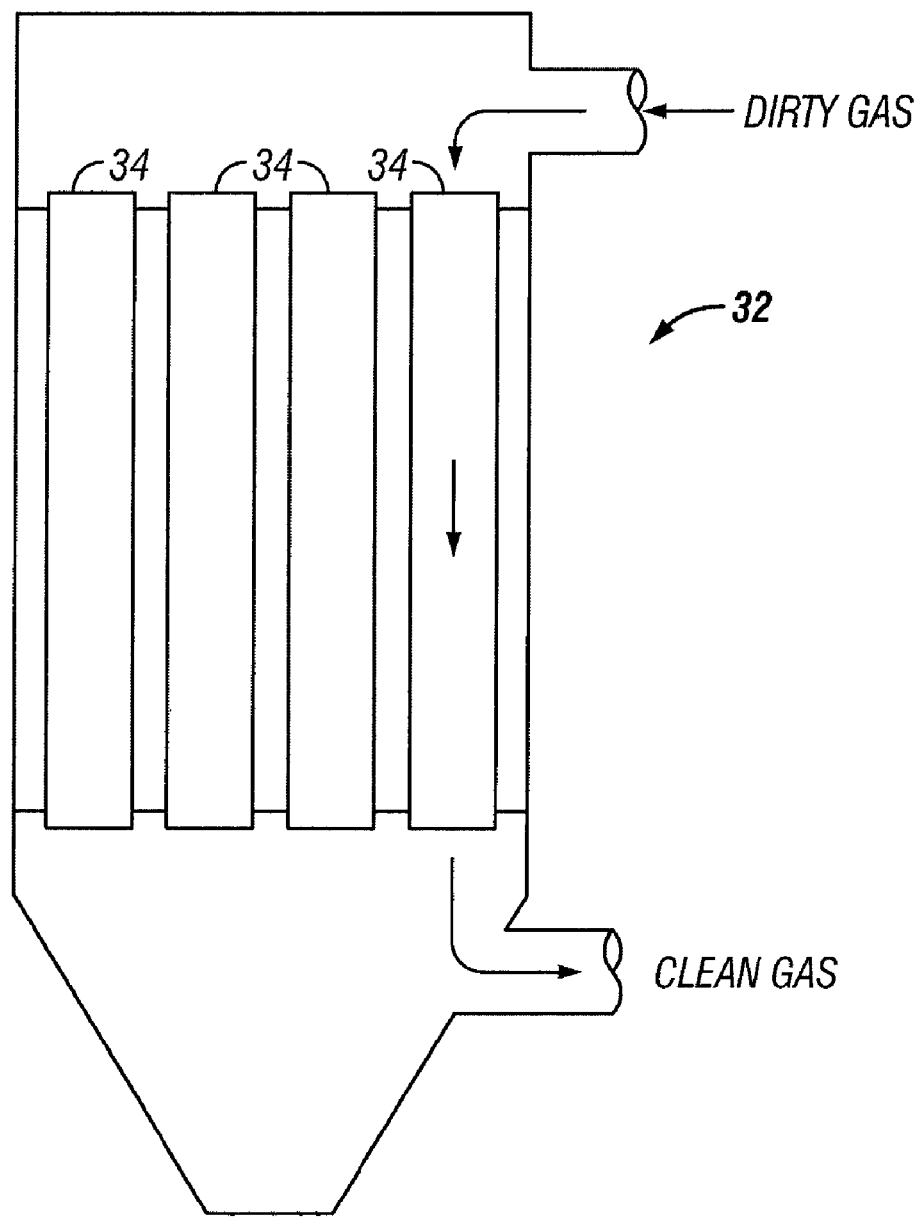
FIG. 2 schematically illustrates a prior art baghouse of the top inlet (TI) variety.

Turning to FIG. 1, a simplified and schematic drawing of a prior-art PJ baghouse design is shown. The baghouse 2 contains filter bags 4, 6, 8, and 10. Each bag has an open top 12 and a closed bottom 14. Thus, when dirty gas enters the bottom of the baghouse 2, particulate matter 16 forms a filter cake upon the exterior of each bag. When the filter cake accumulates to a certain level, performance of the filtration operation is impaired. Hence, the bags must be cleaned by dislodging the accumulated particles 16.

This cleaning is accomplished by activating a nozzle 20A-20D disposed outside of each bag. Each nozzle 20A-20D is connected to a compressed air supply line 22 and is activated by a controller 24. Thus, for example, when nozzle 20A is activated, the particulates 16 upon the exterior of bag 4 become dislodged and fall into hopper 30. The compressed air flows in the direction opposite to the flow of gas that is being filtered. Thus, the operation of the baghouse must be stopped for bag cleaning or else ample refiltration of dislodged particulates 16 will occur.

In contrast to the PJ design, the TI baghouse 32 has bags 34 that are open at both ends. Traditionally, the TI baghouse bags 34 would be cleaned by off-line reverse flow. The invention improves upon this cleaning method.

Figure 3A:
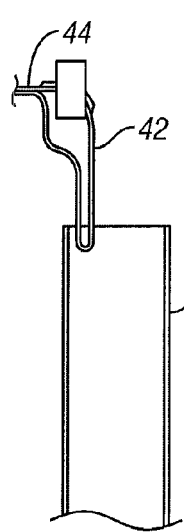
FIGS. 3A-3C schematically illustrate an embodiment of the invention at different stages of bag cleaning.
Figure 3B:
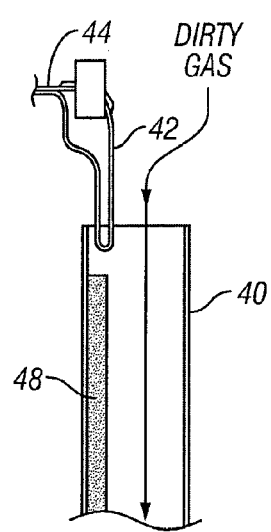
Figure 3C:
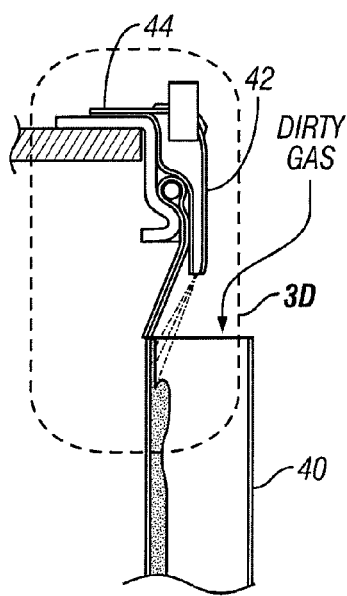

Turning to FIGS. 3A-3D, one bag 40 of a TI baghouse is shown. Disposed inside the top of bag 40 is nozzle 42, which is connected to a supply line 44 of compressed gas. Over time, filter cake 48 builds up on the interior of bag 40 as dirty gas flows through as shown in FIG. 3B. When nozzle 42 is activated as seen in FIG. 3C, a sheet of compressed air 46 directed to the filter cake 48 such that the filter cake is at least partially dislodged as indicated by arrow 49.

Figure 4:
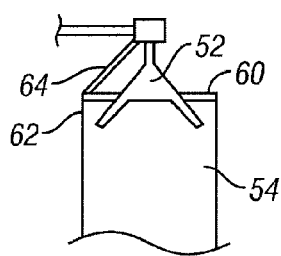
FIG. 4 schematically illustrates a second embodiment of the invention.
Figure 3D:
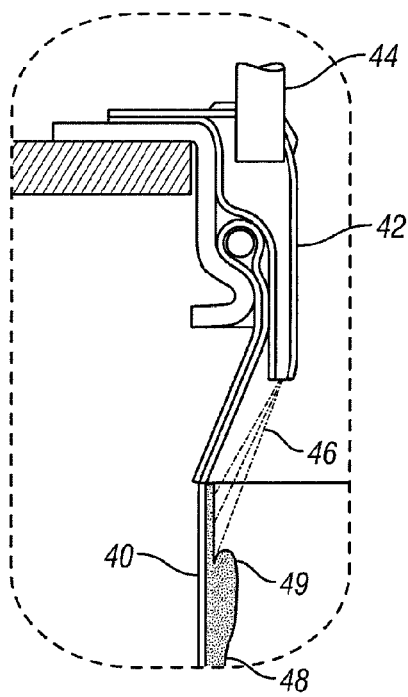
FIG. 3D is an enlarged view of the section indicated in FIG. 3C.

As an alternative design, the nozzle of the invention may contain a plurality of ends through which gas flows. Thus, FIG. 4 illustrates a double-head nozzle 52 disposed in the interior of bag 54. A novel, low cost and very simple means to constrain the upward movement of the nozzle 52 (or 42 of the first embodiment) would be a metal angle ring 60 resting on the top of the bag cuff 62 and a vertical leg 64 in contact with the nozzle 52.

The process of the invention, as illustrated through the embodiments above, includes in essence the steps of: flowing a compressed gas upon an interior of a baghouse bag; and contacting a filter cake disposed upon the bag interior such that the filter cake is at least partially dislodged. This is in contrast to the method practiced in PJ type baghouses because the compressed air in the PJ system only contacts filter cake disposed on the exterior of each bag, thereby limited the effectiveness of cleaning. Moreover, the method of the invention only involves flow of gas in the direction of dirty gas flow (not reverse flow or back washing).

Non-Limiting Discussion of Potential Cleaning Mechanism

When dirty gas enters the top of a newly cleaned or partially dirty bag, the particulate matter takes the least resistant way to reach a surface with the strongest suction (i.e., the surface with the least amount of cake on it). Forty foot long 12" minimal diameter top inlet bags collect a new layer of cake every one or two seconds depending on the face velocity. Each layer has the same permeability and particle size distribution over the length of the bag. A typical layer will be a small number of microns thick.

When some number of layers at the top of the bag are dislodged, the incoming particulate will seek the newly cleaned area and will follow the falling particulate all the way down. Thus, "cleaning" does not mean removing all of the cake, it means reducing the number of layers of cake from a large number to a very small number. The incoming particulate will seek the newly cleaned area just above the dislodged cake and will pursue that area all the way down (symbolized by arrow 49 in FIG. 3D).

In fabric filtration, the fabric serves to collect and hold very small particles, thus reducing the size of the passageways through the fabric to a size that will only pass gas molecules. The BI and PJ baghouses described above use reverse flow to clean the bags. During reverse flow some of the particles residing in the fabric will be dislodged and exit with the reverse flow. On returning to service after cleaning, the residual cake in the fabric has to be restored by replacing the particles lost during reverse flow cleaning. That restoration only takes one or two seconds but during the restoration some small particles will pass through passageways left open by the particles that left during reverse flow. Hence, reverse flow cleaning cannot achieve 100% collection efficiency with back and forth flow through the fabric.

In April of 1981, the Fuller Co. tested one compartment of a TI baghouse serving a coal-fired cement kiln to confirm that top inlet bags operate at constant face velocity. A tape recorder operating at high speed was used to record the pressure loss for one compartment starting with the return to service right after off-line reverse flow cleaning.

The flange-to-flange pressure loss for the compartment was non-linear for approximately 2 seconds and then linear for the rest of the time on line. Those bags were of woven fiberglass with a nominal diameter of 12" and an overall length of 37'. The linear pressure loss rise confirmed that the bags were operating at constant face velocity after the 2 seconds on non-linear pressure loss rise immediately after cleaning.

The explanation for the non-linear rise may be that the permeability of the residual filter cake was not uniform over the length of the bag at the conclusion of the reverse flow cleaning. The first particles to enter the top of the bags right after cleaning seek the paths of least resistance through the residual cake. It took about 2 seconds for the new particles to find and plug those paths through the residual cake and thus restoring the constant face velocity.

A particle traveling vertically down inside a porous 37' long fabric bag in 2 seconds travels at an average speed of about 1100 ft/min. Hence, the speed of the particle is zero at the bottom, and the speed at the top is twice the average or 2200 ft/min.

The cloth area of the test bags was about 116 $ft^2$ and the face velocity was about 2 ft/min. The gas flow rate was about 232 ACFM. ($ft^3$/min). For those conditions, the gas velocity entering the tops of those bags was about 295 ft/min and the fly ash particles in that flow were traveling at about 2200 ft/min. Both of these velocities decreased to zero at the bottom of the bags.

If one assumes a bag with those dimensions, flow rate, and those two velocities, as soon as the cleaning nozzle of the invention exposes some of the residual cake surface at the top of a bag, those fast moving particles entering the top of the bag will hit and stay on that surface. The residual cake area exposed by the compressed air from the nozzle will collect new layers, equivalent to those blown off, in a fraction of a second. The bottom edges of those new layers, which are traveling at that high velocity, likely will not stop moving when they reach the top layers of the old cake.

In other words, they will travel down on the surface of the residual cake and cause the old cake to fall off. All of that would happen between one and two seconds. During that time, the number of complete layers will be a maximum at the top of the bag and will increase rapidly until the cake is uniform in number of layers, permeability and face velocity. After that, the face velocity will be uniform over the length of the bag and the pressure loss increase will be linear. Hence, all the bags will have been cleaned in about two seconds with no interruption of constant gas flow rate and no observable change in the pressure loss across the baghouse.

Various changes in the details that have been described may be made by those skilled in the art within the principles and scope of the invention herein described in the specification and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent processes and products.

What is claimed is:

1. A method for removing filter cake disposed upon an interior of a top inlet (TI) baghouse bag, comprising the steps of:
   (a) flowing a compressed gas through a nozzle fixed interior to a top opening of said TI baghouse bag, wherein an end of said nozzle is fixed proximal to the bag interior; and
   (b) contacting said filter cake disposed upon the bag interior directly with said compressed gas such that the filter cake is at least partially dislodged.

2. The method of claim 1, wherein said compressed gas is air.

3. The method of claim 1, wherein the flow of gas in step (a) is in the direction of dirty gas flow.

4. An improved top inlet baghouse cleaning mechanism, the improvement comprising a nozzle connected to a compressed gas supply, wherein said nozzle is disposed interior to a top opening of said top inlet (TI) bag such that an end of said nozzle is fixed proximal to the bag interior, and wherein compressed gas flowed through said nozzle directly contacts and displaces at least a portion of a filter cake disposed upon an interior surface of said TI bag.

5. The cleaning mechanism of claim 4, wherein said nozzle has a plurality of ends through which compressed gas flows.

6. The cleaning mechanism of claim 4, wherein said compressed gas flows in the same direction as a dirty gas entering said bag.

7. The method of claim 1, wherein steps (a) and (b) occur while said baghouse bag is online.

* * * * *